United States Patent [19]

Rubio et al.

[11] Patent Number: 4,781,557

[45] Date of Patent: Nov. 1, 1988

[54] APPARATUS FOR MANUFACTURING RECONSTITUTED PEPPER AND OTHER FOODSTUFFS IN THE SHAPE OF A STRIP

[75] Inventors: Joaquin Gutierez Rubio; Manuel Varela Fuentes; Engracia Gonzales Centeno, all of Seville, Spain

[73] Assignee: Sociedad Anonima de Racionalizacion (Sadrym), Dos Hermanas Sevilla, Spain

[21] Appl. No.: 65,396

[22] Filed: Jun. 23, 1987

Related U.S. Application Data

[62] Division of Ser. No. 831,252, Feb. 19, 1986, abandoned.

[51] Int. Cl.[4] .............................................. A23P 1/10
[52] U.S. Cl. ...................................... 425/71; 425/147; 425/373
[58] Field of Search ................... 118/117, 414 X, 694, 118/405; 264/212, 213, 216, 217, 175; 425/71, 90, 93, 101, 104, 377, 373, 335, 135, 367, 147, 363; 222/403; 426/575

[56] References Cited

U.S. PATENT DOCUMENTS

| | | | |
|---|---|---|---|
| 1,743,302 | 1/1930 | Allen | 425/367 |
| 3,985,488 | 10/1976 | Hoffman | 425/367 |
| 4,126,704 | 11/1978 | McCarthy et al. | 426/575 |
| 4,141,287 | 2/1979 | Becker et al. | 426/575 |
| 4,144,009 | 3/1979 | Jackson et al. | 425/367 |
| 4,296,140 | 10/1981 | Jaquith et al. | 426/575 |

Primary Examiner—Willard Hoag
Attorney, Agent, or Firm—Abelman Frayne Rezac & Schwab

[57] ABSTRACT

Apparatus for making a reconstituted food product such as pepper, tomato, arian, anchovies and the like including a feed hopper level control, conveyor and a calcium chloride bath for gelling the food material.

6 Claims, 3 Drawing Sheets

APPARATUS FOR MANUFACTURING RECONSTITUTED PEPPER AND OTHER FOODSTUFFS IN THE SHAPE OF A STRIP

This is a division of application Ser. No. 831,252, filed on Feb. 19, 1986 and now abandoned.

DETAILED DESCRIPTION OF THE INVENTION

The present invention relates to a method for manufacturing reconstituted pepper and other alimentary products which adopt the shape of a strip or band, it also relates to the corresponding installation required for that method to become operative. In more concrete terms, the invention deals with the production of reconstituted products adopting a form such that they may be used as products suitable for stuffing edible olives with the cooperation of automatic machines specifically designed to that purpose.

Prior to the present invention, the logically continuous process of improving automatic olive-stuffing machines, from their entry into the market as a replacement for the traditional method of stuffing olives with strips of red peppers by hand, was strongly restricted.

Basically, these restrictions were:

Automation was only possible when the stuffing material used was pepper.

The maximum speed for each filling head waas 120 olives per minute. The machine was fed with fillets or strips of pepper whose width was proportional to that of the olive in question.

Due to the size of peppers it was hard to obtain strips longer than 15 cm. and it should further be borne in mind that a workman had to place the pepper fillets one after the other, without any spacing between them, on a conveyor belt which fed the machine, there being provided a previous step to permit a uniform width for each strip thanks to the cooperation of a tool and a knife.

Improving the utilization of peppers was impossible.

The pepper employed, usually of the variant known as "morrón", used to be prepared in the following manner: the seasoned peppers, duly selected following size and uniformity criteria and properly washed, were peeled by baking or by chemical methods. Next to that, their placenta, seeds, stem and calyx were removed and placed in wooden or polymeric containers, where, under salt saturation conditions, peppers fermented slowly.

When these peppers were cut into strips, trimmings which amounted to 30% of the original pepper were produced and, as a consequence of their loss of utility, depreciated up to 80% of their original value.

Thus, it is easy to understand the important advantages of presenting the products used for reconstituted stuffing in the form of a strip or band of unlimited length and having a suitable uniform section.

By using the process claimed by the invention the production speed of the machine goes up to 1600 olives per minute, thus reducing manpower cost during the stuffing process to one fifteenth of the original cost and facilitating the automatic stuffing of olives with onion, orange, anchovy and other products, and not only with pepper.

Furthermore, in the specific case of peppers, the source from which they are obtained need not necessarily be peppers in brine, as they may be presented in any other form, which results in important economic consequences. Likewise, trimmings are avoided and it is even possible to make good use of the trimmings originating in the manual manufacturing processes.

All of these improvements have been made possible thanks to the rationalization introduced by the present invention within the olive industry.

The object of the present invention is centered on the production of a pepper gel or a gel made of other food products such as onion, orange, anchovy, etc., reconstituted and having the shape of a strip, with a practically constant rectangular section and indefinite length, and being provided with mechanical, physico-chemical and organoleptic characteristics such that it is capable of satisfactorily standing the addition of single, combined, tension, compression, shearing and bending stresses, to which stresses the said pepper gel will be subjected, during the olive-stuffing operation, by the pitting-stuffing machines, normally being used by the current olive industries. The expression "satisfactorily" should be taken in the sense that each segment of the strip must remain bent in a U-shape inside the olive, without breaking at the bending zone.

Thus are defined, in a practical manner, the values of the mechanical strains that it must stand, as it is impossible to establish a correlation between the values of pure tension, compression, bending and shearing strains, obtained by means of measuring devices, which operate with very specific measurements, and the behaviour of the gel when subjected to a combination of these strains under different conditions. It should further be understood that the best and most representative test for the product is that being carried out with the cooperation of a pitting-stuffing machine.

The above elasticity and resistance characteristics should be kept close to a maximum, within an adequate preservation agent, until such time as the stuffing operation is effected, which normally takes place between 10 and 40 days after the date of production of the gel.

The gel must remain stable within the preservation agent used for the olives, such that it will not disgregate or dissolve into said agent. At the same time, it should not be thermoreversible and it should remain firm enough to allow the culinary operations of the stuffed olives which require heating, as well as a possible pasteurization of the canned olives, if this thermical treatment was required.

The organoleptic characteristics should come close in colour, odour, taste and palatability to those of the fresh pepper itself.

Once the characteristics required for the product have been defined, it is necessary to select the gelifying agent to be used and the method to be followed. It is equally necessary to define the working conditions and parameters which participate in the method, in order that the results thus obtained may be used from a quality viewpoint and with a view to achieving maximum economic advantages.

From the various gelifying agents that may be used in principle, the invention basically contemplates pectines, carragenates, agar-agar, xanthan gum, carob bean gum and the aliginates, dropping the first four agents for the following reasons:

Pectines, although very adequate for systems having a high concentration of sugar, present a considerable decrease in performance when used in association with systems having a low concentration of sugar, like in the present case. Simultaneously, it is a fact that it would not be feasible to manufacture a strip having the above-mentioned characteristics, given that a method or process based on pectines should be directed towards the injection of the product in a liquid or pasty state and the subsequent gelification and cooling inside the cavity of a pitted olive.

Similar criticism could be made about the low-methoxyl pectines, which are sensitive to calcium and require a lower sugar concentration.

Anyway, high concentrations of pectines are required, which, due to their own nature, require heating between 70° and 95° C. for a long time, so that they may dissolve into water.

Carragenates are widely employed for the production of gels, usually combined with carob bean gum and with certain quantities of potassium chloride. Just like in the case of pectines, carragenates require being dissolved with heat and gelify when cooled.

A drawback found when applying carragenates to the present case is that, in addition to forming thermoreversible gels, said gels tend to hydrolyze in acid brines having a high concentration of sodium chloride, like in the case of olives, this being the reason why it is impossible to maintain the mechanical characteristics required to produce a stuffing of good quality, after up to 40 days from their production date, if they are to be stored in association with a brine acting as the macerating fluid.

Agar-agar requires heating in order to be dissolved. Its gels fully lack the elasticity required for the application of the invention, are thermoreversible and hydrolize inside acid brines.

The xanthan gum—carob bean gum system requires heating-cooling and its gels are by no means provided with the required elasticity and consistency, whereas they have thermoreversible properties.

Finally, in connection with the alginates, it should be noted that the monovalent salts of the alginic acid are soluble in water, whereas the diatomic and trivalent salts are generally insoluble. It is this characteristic that can be favourably used for the production of gels with the cooperation of alginates.

Out of the salts that can be obtained from the alginic acid, the sodic salt is preferred, and with respect to the diatomic cation, which acts insolubilizing the sodium alginate, calcium is preferred.

From the different types of sodium alginate available, those having a ratio of guluronic acid to manuronic acid greater than 1 are preferred, and out of these, those made basically from seaweed shoots, of the *Phaeophyceae Laminaria Hyperborea* family, and having a viscosity of between 500 and 1000 cps. for a solution at 1% weight/volume in water at 20° C.

For this application, the internal gelification processes, that is to say, those processes in which the sodium alginate is mixed with insoluble calcium salts which subsequently solubilize, usually by means of a change in the PH of the agent, have not been regarded as ideal. With this system the $Ca^{++}$ is not distributed at a molecular level, which causes uniformity differences. Furthermore, there is always a fraction of calcium that solubilizes prior to the gelification itself, thus requiring the use of trapping agents which trap said free calcium. All of this implies a reduction in the gel's strength.

In a process of this kind, the starting time of the gelification process is critical and, in order to obtain the best results, a most accurate adjustment of the proportions and operations involved is required.

The production of gel through cooling of a solution composed of sodium alginate and soluble calcium salts does not provide satisfactory results either. In this procedure, as long as the temperature remains high, the increased molecular motivity prevents the $Ca^{++}$ ions from fixing on the carboxylic radicles of the alginic acid, thus displacing the $Na^+$. The gelification takes places as the molecular motivity decreases as a consequence of its cooling. The main disadvantage in using this method, apart from requiring heating, lies in the fact that the alginate undergoes depolarizations when subject to high temperatures and that a portion thereof always gelifies subject to strains prior to its cooling. All of this results in a loss of strength in the gel, in a process in which the time and temperature factors are critical.

According to what has been set out above, it has been considered that the alginate gelifying method that provides the best results is, no doubt about it, that of molecular diffusion of $Ca^{++}$ all over the sodium alginate, since it permits reaching the maximum strength of gel. Further, the resistance and elasticity properties are the greatest on the outer surface and the least on the central zone, unlike the alginate gels obtained by means of the aforesaid methods, which constitutes an advantage in view of the nature of the operations to which the gel is to subjected in order to be stuffed inside a pitted olive.

Once the characteristics of the product to be manufactured, the gelifying agent to be used, and the method followed in the gelification have been defined, the desired product can only be obtained within certain limits for the parameters which are peculiar to this process, and under certain conditions, in the forming operation.

Starting from the preferred considerations, the process unfolds in the following manner:

The starting raw material is red pepper, be it fresh, concentrated, baked and then preserved in brine, peeled and pasteurized, fermented or presented in any other alimentary and toxicologically adequate form, since its presentation is not critical to the process. However, it is preferred using concentrated sieved pulp of red pepper, that is to say, red pepper from which have been removed, through physical procedures, skin, seeds, stem and the portion of humidity required to make its conservation possible thanks to a thermical pasteurization treatment inside hermetically-sealed containers.

The operational process incorporates slight variants depending on the shape of the pepper to be used. Thus, if the pepper is fresh, the pulp must be separated from the skin, seeds and stem, and the enzymes must be inactivated thermically. To the effect of preserving the product in a brine, it will be necessary for the product to be desalted, since the high concentrations of $Na^+$ would otherwise obstruct a good gelification of the alginate. In regard to highly acid forms of presentation of the peppers, they will have to be neutralized partially, since an excessively acid PH would lead to the precipitation of the alginic acid and not to the formation of the calcium alginate.

To the effect of setting out the method herein proposed, the present invention starts from a concrete example of concentrated pepper, as this form of presentation is considered to be the most representative and rational with a view to the handling, storage, formation and conservation thereof.

For this application, it is preferred using a pepper concentrate of the so-called "hotbreak", that is to say, one pepper having high consistency, soluble solids between 14° and 19° Brix, absorbance of the ethanolic extract at 2.5% P/V, between 0.55 and 0.85, measured at 470 nm (nanometers), and the size of its particles having a diameter of under 0.5 mm.

A higher degree of concentration causes difficulties in the rehydration of the pepper, whereas lower concentrations, that is, products with a higher content of water, require more vigorous thermical treatments, which results in a lower product quality.

An increased pastiness, as well as an increased absorbance, as colour index, help to provide the raw material with good quality.

The given size of less than 0.5 mm for the diameters of the particle, obtained through coarse grinding and the subsequent sieving thereof, assumes that the product is presented without seeds, skin and stem, and that the grinding done was fine enough for the product to undergo a reconstitution process and to allow a continuous and homogeneous structure within the limits of sensory appreciation of the human palate.

Modifying the proportion of pepper pulp to be employed, there can be obtained a wide range of finished product qualities, so to cover the market demand for different qualities, which proportions should be encompassed between 25% and 95% and, preferably, between 45% and 75%.

The pepper concentrate should dilute into water up to the desired concentration.

For this dilution it is advisable that the water used be slightly hard, preferably without solubilized $Ca^{++}$ ions. If the hardness of water was very high, the use of trapping agents for the $Ca^{++}$ should be required in order to obtain a good yield out of the quotient sodium alginate concentration/gel strength. This is a well-known fact within the technique of producing gels with alginates.

A dry mixing of sodium alginate, guar gum and potassium sorbate dissolves into the diluted pepper concentrate, with the aid of suitable mechanical elements.

As it is well known, every system has advantages and inconveniences: equipments supplying low-stirring speed and low-shearing stresses provide higher viscosity solutions at the cost of spending considerable time in the hydratation operation, whereas, on the contrary, equipments delivering high-stirring speed and high-shearing stresses provide a faster hydratation, although at the cost of losing some viscosity.

Tests carried out on purpose have proved that the best applicable system is that of obtaining a very fine dispersion of the solid products in a powdery form inside the concentrated pepper dilution, thus avoiding the formation of clots and a subsequent solvation, thanks to a moderate stirring of the mixture. Now then, as stated above, it is possible to obtain a good solution by the action of any conventional equipment currently being manufactured for the preparation of water solutions of products like the hidrocolloids.

To the object of obtaining a product with the highest stability in the presence of oxidation phenomenous, it is important that the mixing and the solution of the additives with the pepper pulp be effected under vacuum conditions or, alternatively, that the resulting dough be deaerated prior to the gelification stage.

The deaeration in turn improves the appearence and uniformity of the finished product. There exist no special requirements for this operation, thus, any of the equipments available in the market for the deaeration of viscous products may be used with satisfactory results.

The guar gum has been incorporated with the triple object of obtaining a texture more similar to that of the pepper, reducing the syneresis that a calcium alginate gel of the characteristics proposed in the invention entangles, and increasing the viscosity of the dough prior to its gelification so that it may be molded more easily.

Although there exist many types of guar gum which can be used, those having a viscosity ranging from 3000 to 5000 cps., for a solution at 1% weight/volume in distilled water at 20° C., will be preferred.

The dosage in which it is used ranges from 0.3% to 1.5% and more precisely between 0.8% and 1.2%.

The potassium sorbate avoids the growth of fungi and yeast, which could give rise to alterations, during the stage of conservation of the reconstituted pepper and prior to its stuffing inside the olives. A concentration lower than 500 ppm. is sufficient to achieve this object within a process according to good manufacturing practices.

Although different qualities or types of sodium alginate may be used, the best results are obtained when using those types extracted from shoots of *Laminaria Hyperborea* free of $Ca^{++}$ and having a viscosity level of between 500 and 1000 cps. for a solution of 1% weight/volume in distilled water at 20° C. A concentration of between 1.5% and 2.5%, expressed in the form of alginic acid, provides satisfactory results, although a concentration of between 1.6% and 1.9% is preferred.

The next stage in the process, once the dough made of pepper, sodium alginate, guar gum and potassium sorbate has been prepared, each of said elements participating in the aforesaid adequate proportions, consists of molding the gel in the form of a strip or band having a quasiconstant width, rectangular section and indefinite length.

The concentration of $Ca^{++}$ ions, the speed of difussion of said ions towards the interior of the dough and the time of contact are considered to be critical factors in regard to the mechanical characteristics of the gel.

Although other diatomic or trivalent cations are likely to be employed, reference is made exclusively to the $Ca^{++}$ due to its proven advantages over any other, since it is a proven fact for those who know about this technology that in order to obtain highly resistant alginate gels it is necessary that the $Ca^{++}$ be to excess, making exclusive reference to the calcium chloride ($CaCl2$) as a source for the $Ca^{++}$ ions, dropping, in principle, salts such as the calcium lactate and the calcium acetate, both of which have a much lesser solubility and a much higher price than the calcium chloride.

The difussion speed in this process depends on the concentration of $Ca^{++}$ cations, on the greater or lesser presence of monovalent cations such as the $Na^+$, and on the PH and temperature of both the dough and the gelifying agent. In this particular case, there has been underestimated the influence of factors such as the concentration of guar gum, the degree to which the pepper has been ground, and the possible stirring of the gelifying agent, as said factors are considered to be much less important than the aforesaid.

By adjusting all of these variables there will be obtained the specific gelification conditions required in the present process.

Thus, within the gelifying agent, the concentration of $Ca^{++}$ should range from 8% to 24%, preferably from 10% to 12%, expressed in the form of calcium chloride, the concentration of $Na^+$ should range from 0% to 6%, preferably from 0.5% to 2%, expressed in the form of sodium chloride, PH should be kept between 3.5 and 7.5 values, preferably between 4.5 and 5.5 values, and the temperature should be kept between 10° and 40° Celsius, preferably between 18° and 24° C.

In regard to the set of conditions required within the gelifying agent, there exists an optimum time of contact between the pepper dough and said agent, such that, if the time was excessively short, the gelifying action would not reach the central zone of the dough and irregularities in the uniformity of the strip or band and in the subsequent handling thereof occur, whereas, on the contrary, if the time of contact was excessively long, the gel would tend to become brittle and fragile, thus losing part of its elasticity. Once the characteristics of the gelifying agent have been fixed, the time of contact is a function of the width of the strip or band and ranges from 6 to 20 minutes for widths encompassed between 2 and 8 mm. All of this is valid for a temperature of the dough ranging from 18° to 36° C.

With these gelification conditions, determined by test, must operate the elements of the installation which effect the molding of the dough into a strip. These elements should also meet the following requirements:

Provide a quasiconstant and uniform width to the strip or band, wherefore the installation must supply a constant flow of dough and be accurate enough when it comes to laminating same.

Gelify the two sides of the strip simultaneously, in order to avoid differences in performance between them, wherefore it should be possible to apply calcium chloride over the two sides simultaneously and in equal conditions.

Watch and accompany the gel being formed until such time as the degree of gelification is high enough to ensure that the phenomenons of surface tension and drifts of ungelified dough, which occur in the interior of the strip, will not alter its geometrical shape or its uniformity, and the full gelification may take place inside a bath where the strip may float freely.

Thus, there exists a bath of about 20-25 cm. deep, 1 m. wide and between 15 and 60 m. long, placed next to the forming or molding machine, which bath, filled up to two thirds of its height with an adequate calcium chloride solution, serves to help the strip complete its gelification up to its central zone. The solution contained in this bath continuously recirculates and, in order to correct and maintain said solution within its adequate values, an installation interbedded with the calcium chloride recirculation circuit will be necessary.

As a last operation, prior to its packing and its preservation, the already gelified strip receives a water wash inside a small bath arranged to that object and placed next to and at a lower level than the aforesaid gelification bath. The purpose of placing this wash bath at a lower level is none other than keeping the strip stiff inside the gelification bath and to permit said strip to displace along said bath, at the same speed as it is formed in the molding machine, thanks to the weight of the branch of strip encompassed between the liquid levels of the said two baths.

The purpose of this wash is to eliminate the excess of calcium chloride carried by the strip of the gelification or setting bath. The wash water is renewed continuously by overflow at a rate of 0.2-0.5 liters of water per kilogramme of washed strip.

Prior to its packing, which can be done in drums having a capacity of 220 liters and made of a polymeric material suitable for alimentary purposes, the strip, having a width ranging from 500 to 700 mm., is cut longitudinally, usually into two halves, soon after it has been centered on a suitable cutting element provided to that object.

The conservation agent employed is basically an acid brine having salinity and acidity values such that, according to the ratio Kg. of strip/Kg. of conservation agent used, the PH and salinity values of the balanced assembly should be 3 to 3.4 for the PH and 5% to 8% for the salinity, expressed in the form of sodium chloride. The strip/agent ratio may vary between 1.1 and 2.1 and the acids used to adjust the PH must be organic acids of a quality as required for foodstuffs, such as lactic acid, acetic acid, adipic acid and citric acid, preferably citric and/or lactic acids.

It is of vital importance, if we wish to maintain the characteristics of the strip in optimal conditions, that the balance $Ca^{++}/Na^+$ be suitable to the type of alginate employed and to its relative specific affinity for these two cations. For the majority of the alginates these optimal conditions are encompassed between 1 and 3.

The product thus prepared is stable from the physical, chemical and microbiological points of view and, if properly stored, it will maintain its ideal characteristics for the stuffing of olives until such time as this operation takes place, which, as stated before, usually happens between 10 and 40 days from the date of production.

To complement the following detailed description and for a better understanding of the characteristics of the invention, reference is made, as an integral part of said invention, to the accompanying drawings which, in an illustrative and non-limiting manner, show the following.

Figure 1:
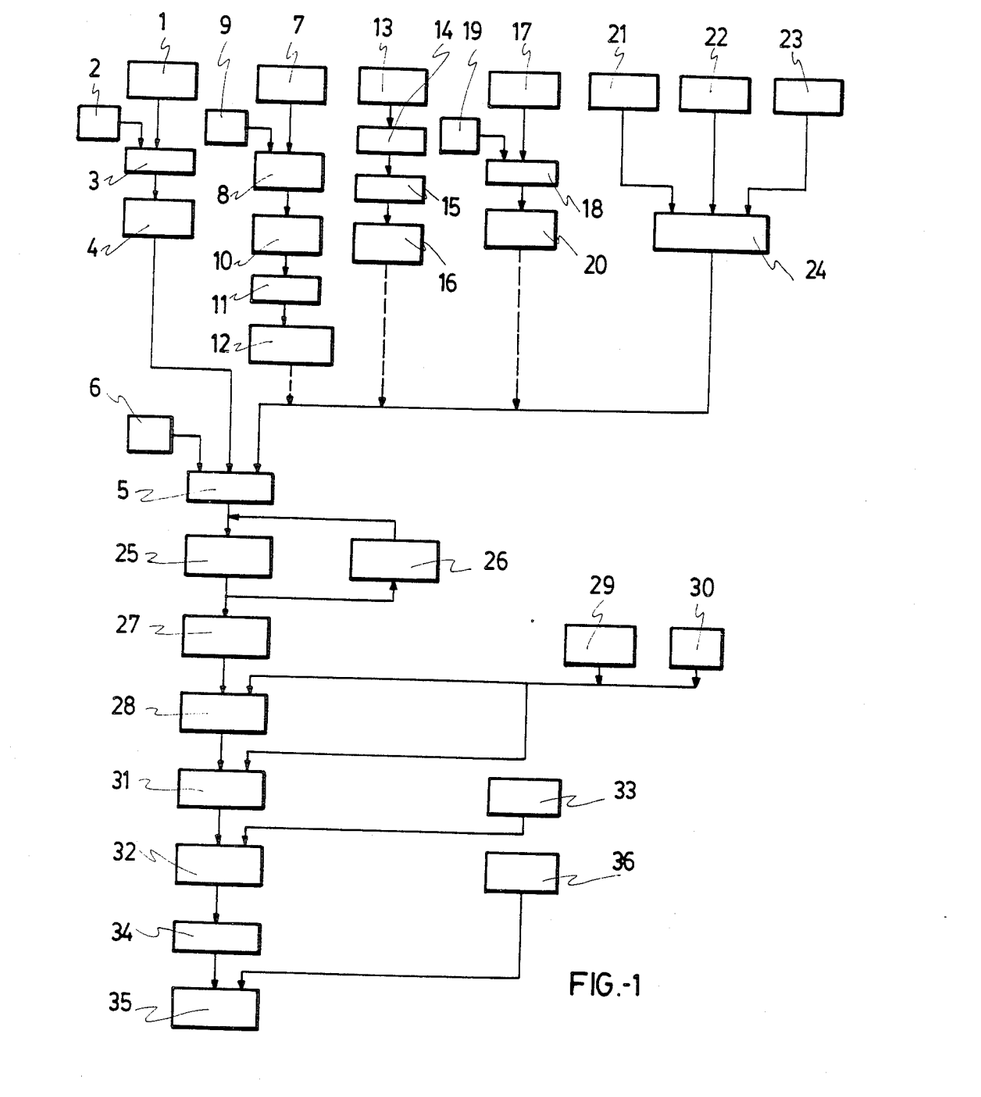
FIG. 1 is a diagramatic representation of the method for manufacturing pepper or other food products, reconstituted in the form of a strip.

Referring to these figures and more specifically referring to the diagram illustrated in FIG. 1, it will be seen how, in order to put the method into practice, it is possible using concentrated pepper as raw material, but it is equally possible using pepper in brine, fresh onion, concentrated tomato or any other suitable foodstuff.

When we start from concentrated pepper 1, this pepper is supplied jointly with water 2 into a mixer 3 to the object of obtaining a pepper pulp 4 which is supplied to the scatterer 5 which also receives water 6.

When using pepper in brine 7, same is supplied to a desalting tank 8, which also receives water 9, from which tank desalted pepper 10 is obtained and then supplied to a grinder 11 in order to obtain ground pepper pulp 12.

On the contrary, if we use fresh onion 13, same is first supplied to a grinder 14 and subsequently taken to a sieve 15, thus obtaining sieved onion pulp 16.

If we are to use concentrated tomato 17, same will be supplied to a mixer 18, jointly with water 19, so that tomato pulp 20 may be obtained.

Depending on the type of product selected, the pepper pulp 4, the ground pepper pulp 12, the sieved onion pulp 16 or the tomato pulp 20 are supplied to a scatterer 5, jointly with the mass of water 6 and with an auxiliary mixing of sodium alginate 21, guar gum 22 and potassium sorbate 23, previously processed in a mixer 24.

The product goes from scatterer 5 into a stirrer 25, with which a deaerator 26 cooperates, thus producing a dough 27, be it pepper, onion, tomato, etc., which is supplied to the molding machine 28, which machine also receives calcium chloride 29 and water 30.

The product goes from the molding machine 28 into a gelification bath 31, to which calcium chloride 29 and water 30 are also supplied, and from this gelification bath 31 into a wash bath 32, which logically also receives water 33, said product finally goes into the cutting machine 34 and it is subsequently subjected to the packing 35 with the contribution of the corresponding preservation agent 36.

Figure 2:
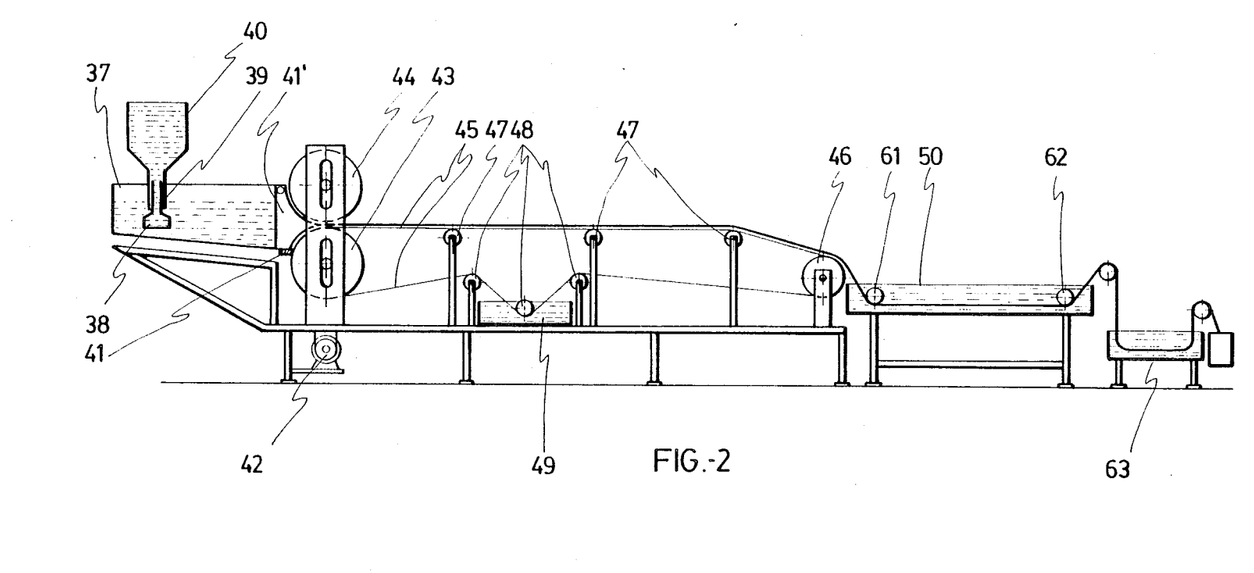
FIG. 2 is a side elevational schematic view of the molding machine which forms part of the installation required to carry out the method of FIG. 1.

In regard to the molding machine, referred to under reference no. 28 of the diagram of FIG. 1, and according to the configuration illustrated in FIG. 2, said machine comprises a feed hopper 37 which maintains a quasiconstant dough thanks to a gate gear 38 which either permits or restricts the gravity feed of dough through the pouring tube 39 and from a vacuum tank 40 which receives the dough of pepper, onion, tomato, etc. In more concrete terms, the gate gear 38 is embodied by a buoy which is subject to the hydrostatic drive of the product dough existing in the feed hopper. Said hopper 37 has attached thereto a plurality of rubber bands 41—41', suitable for alimentary purposes, arranged all along the connecting line, such that the hopper will fit into the laminating head with a perfect tightness.

In a more concrete manner, there exist a lower band 41 and two bands 41' acting as side caps.

The laminating head comprises a gearmotor 42, a guide roller 43 and a driven roller 44, both rollers being interrelated by the classical system of toothed wheels, the upper or driven roller 44 is the true laminating roller, whereas the guide roller 43 is associated to a conveyor belt 45 which closes itself over a second driven roller 46, within said belt is defined an upper or operating sector, with the cooperation of a plurality of idler rollers 47 which keep said belt 45 in a markedly horizontal disposition, while the lower sector of said belt, with the cooperation of guiding rollers 48, is forced to pass through the open surface of an impregnation tray 49.

The conveyor belt 45 is made of an absorbent material which complies with the regulations established by the Food Industry. Thus, the belt gets impregnated with the calcium chloride contained in the tray 49, said guiding rollers 48, which force the belt to submerge in the tray 49, further act as tension rolls for said belt.

In regard to the laminating rollers 44, which obviously must move in the opposite direction to that of the guide roller 43, it is constituted by a sintered porous material, suitable for alimentary purposes, which permits the flow of a calcium chloride gelifying solution acceding to the interior thereof through its shaft, said shaft thus being hollow. The height of said roller 44 may be adjusted with respect to the conveyor belt 45, with a view to determining the specific thickness of the strip of product to be obtained.

Both the impregnation tray 49 and the laminating roller 44 are fed with a calcium chloride gelifying solution through the corresponding conduit coming from a general tank which also feeds the bath 50.

Figure 3:
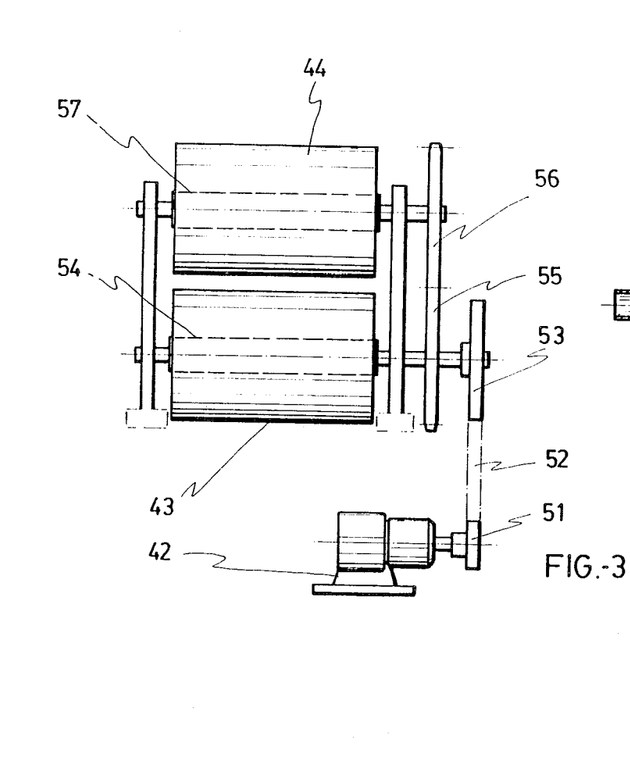
FIG. 3 is an elevational close view of the guide roller and the laminating roller, together with their corresponding transmission.

In a more concrete manner, according to a preferred example of practical construction,, the gearmotor 42, by means of the escape pinion 51 and of a couple of toothed wheels 52 and 53, activates the shaft 54 of guide roller 43, whereas said shaft is linked to another toothed wheel 55 which gears a second toothed wheel 56 linked to the shaft 57 of the laminating roller 44 and activates said roller 44.

Figure 4:
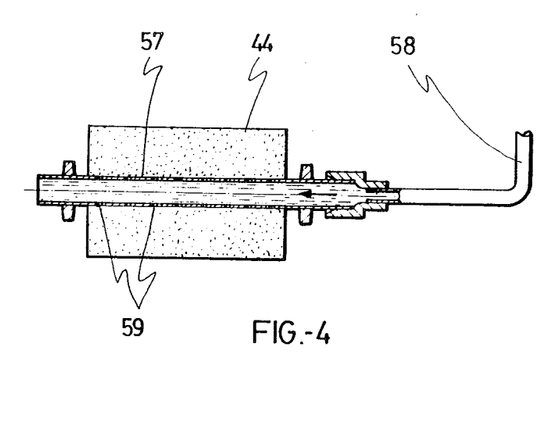
FIG. 4 is a close diametrical section view of the laminating roller.

Besides, as illustrated in FIG. 4, the shaft 57 of the laminating roller 44, which roller, as said before, is made of a sintered porous material, is hollow and receives the gelifying solution through the conduit 58 and incorporates radial orifices 59 through which said solution goes into the porous material of the roller in the strict sense 44.

Inside the bath 50, the belt 45 is forced to pass underneath two rollers 61 and 62 so that it will always be submerged while passing therethrough.

Finally, said belt passes through the wash tray 63, which obviously contains water being renewed continuously and constantly as the belt moves forward, so that the possible excess of calcium chloride carried by the belt may be eliminated.

As set out above and illustrated in full detail in FIG. 2, there exists a difference in the level or height of the baths 50 and 63 so that the weight of the branch of strip suspended between the two levels will cause said strip to move, at a constant tension, all along bath 50 at he same speed as it leaves the molding machine. From what has been said so far, in connection with the installation required to put this method into practice, follows that, according to the objects of the present invention, the dosage is carried out at constant flow, since the conveyor belt, limited by the separation of the laminating roller, carries the pepper dough at a constant displacement speed and at a likewise constant hydrostatic pressure, wherefore the amount of dough supplied is also constant. Apart from that, the gelification is effected simultaneously on both sides of the belt. Further, the gel being formed is accompanied only until such time as its reticulation is good enough to stand the subsequent gelification freely inside a bath.

Finally, to complement the present description, a series of examples of preferred practical application are provided.

EXAMPLE 1

The following ingredients and additives, in the specified proportions, are used as starting products:

| | |
|---|---|
| Pepper concentrate at 15° Brix, expressed as pepper pulp at 5° Brix | 45% |
| Water without calcium | 52.45% |
| Sodium Alginate | 1.8% |
| Guar gum | 0.4% |
| Potassium Sorbate | 0.05% |
| | 100.00% |

Sodium alginate, guar gum and potassium sorbate are dry-mixed and finally scattered into the pepper which was previously mixed with water.

The pasty mixing thus obtained hydrates through stirring in a mixer till a constant viscosity is obtained. This period of time is 30 minutes for layers of 500 Kg.

The obtained dough is deaerated by making it fall, in the form of a film, into a vacuum chamber with 750 mm. of depression mercury.

The dough is passed, by means of a positive displacement pump, from the deaerator into a vacuum tank which, by gravity and regulated by the aforesaid buoy mechanism, feeds the hopper of the molding machine.

The dough is gelified superficially when it comes in contact with CaCl2 solution between the laminating rollers of the molding machine, which rollers are situated with their shafts at right angles to the shaft of the conveyor belt and allow a minimum distance between generants of 4 mm. The strip completes its gelification after 20 minutes of running along the gelification bath which contains a calcium chloride solution at approximately 16% weight/volume. The now fully gelified strip is washed with water for 1 minute and packed in an acid brine such that the product in balance with the brine will have a PH under 3.5 and a salinity of 5% weight/volume, expressed in the form of sodium chloride.

EXAMPLE 2

The procedure of example 1 is repeated with the exception that the concentrated pepper is replaced by pepper preserved in brine, desalted to reach a content of sodium chloride below 0.5% and finally ground. The pepper thus prepared contributes to the formula with 45% of the total ingredients and additives.

EXAMPLE 3

The procedure of example 1 is likewise repeated, with the exception that the concentrated pepper is replaced by fresh onions, withou tunics or dry parts and finally ground. The onion thus prepared contributes to the formula with 45% of the total ingredients and additives.

EXAMPLE 4

The procedure of example 1 is once again repeated, with the exception that the concentrated pepper is replaced by concentrated tomato. The tomato thus prepared contributes to the formula with 45% of the total ingredients and additives, expressed in the form of tomato pulp at 5° Brix.

All of these products are envisaged for use as olive stuffing with automatic machines, preferably. However, these reconstituted products may also be used to cover other needs within the food industry, such as precooked dishes, sauces, seasonings, etc.

We claim:

1. An apparatus for manufacturing a foodstuff selected from the group consisting of reconstituted pepper, tomato, onion, orange, anchovies and the like in the shape of a strip comprising a feed hopper containing the foodstuff in the form of a dough, an upright vacuum tank mounted in said feed hopper and having a pouring tube positioned at the bottom of said vacuum tank and communicating therewith, a flow restricting means positioned at the exit to said pouring tube to maintain a substantially constant level of dough in said feed hopper by metering the flow rate of dough exiting said pouring tube, said feed hopper coupled to a laminating head by a plurality of rubber bands, said laminating head having an associated conveyor belt to move said strip of dough through a first tray comprising a gelification bath consisting of a calcium chloride solution and finally through a second tray comprising a bath of water for washing the gelified strip of dough.

2. An apparatus as set forth in claim 1 wherein the laminating head comprises a guide roller in cooperative engagement with a laminating roller, said guide roller and said laminating roller being adjustably spaced with respect to each other to provide a uniform and constant width to the strip of dough, said guide roller being driven by a gear motor which in turn drives said laminting roller.

3. An apparatus as set forth in claim 1 wherein said conveyor belt has a return sector, said return sector being submerged in an impregnating tray containing a calcium chloride solution by a plurality of guiding rollers, said conveyor belt comprising an absorbent material which supplies the calcium chloride solution to the lower surface of the strip of dough, said laminating roller comprising a sintered, porous material having a hollow shaft provided with a plurality of radial orifices to receive through said shaft, in parallel, the calcium chloride solution provided by a feed tank for said laminating roller and from said impregnating tray, such that the laminating roller supplies said calcium chloride solution to the upper surface of said product strip, thus obtaining a simultaneous gelification of both surfaces of said product strip, said gelification being completed inside said first gelification tray arranged at the end of the conveyor belt, said gelified strip being expelled at this point by said conveyor belt.

4. An apparatus as set forth in claim 1 wherein within the first tray containing the gelification bath arranged at the end of the conveyor belt, at least two rollers are disposed such as to maintain in the product strip submerged within the gelification bath.

5. An apparatus as set forth in claim 1 wherein the wash bath is disposed at a lower level than the first tray containing the gelification bath thus defining for the product strip a suspended branch which, by gravity, determines that the rate of speed of said product strip passing through said gelification bath is substantially the same as its rate of speed upon exiting the laminating head.

6. An apparatus as set forth in claim 1 having means for continuously adding water to the second tray to continuously replenish the water bath as the conveyor belt moves forward whereby excess calcium chloride is continuously removed by washing.

* * * * *

UNITED STATES PATENT AND TRADEMARK OFFICE
CERTIFICATE OF CORRECTION

PATENT NO. : 4,781,557

DATED : November 1, 1988

INVENTOR(S) : Gutierez Rubio et al.

It is certified that error appears in the above-identified patent and that said Letters Patent is hereby corrected as shown below:

Cover page, at [75] Inventors, delete the names of "Manuel Varela Fuentes and Engracia Gonzales Centeno"

Signed and Sealed this

Thirteenth Day of June, 1989

Attest:

DONALD J. QUIGG

*Attesting Officer*  *Commissioner of Patents and Trademarks*